United States Patent
Luo et al.

(10) Patent No.: US 9,338,773 B2
(45) Date of Patent: May 10, 2016

(54) COMMON SEARCH SPACE FOR EPDCCH IN LTE

(71) Applicant: QUALCOMM Incorporated, San Diego, CA (US)

(72) Inventors: Tao Luo, San Diego, CA (US); Wanshi Chen, San Diego, CA (US); Peter Gaal, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 458 days.

(21) Appl. No.: 13/789,520

(22) Filed: Mar. 7, 2013

(65) Prior Publication Data

US 2013/0250874 A1 Sep. 26, 2013

Related U.S. Application Data

(60) Provisional application No. 61/615,803, filed on Mar. 26, 2012.

(51) Int. Cl.
*H04W 72/04* (2009.01)
*H04W 48/12* (2009.01)

(52) U.S. Cl.
CPC ............ *H04W 72/042* (2013.01); *H04W 48/12* (2013.01); *H04W 72/04* (2013.01)

(58) Field of Classification Search
CPC ............................ H04W 48/12; H04W 72/042
USPC ........................................................ 370/329
See application file for complete search history.

(56) References Cited

U.S. PATENT DOCUMENTS

| 8,570,969 B2* | 10/2013 | Kim ...................... H04L 5/0007 370/329 |
| 2010/0254268 A1* | 10/2010 | Kim .................... H04W 36/385 370/241 |
| 2010/0303011 A1* | 12/2010 | Pan ......................... H04L 5/001 370/328 |
| 2011/0077038 A1 | 3/2011 | Montojo et al. |
| 2011/0228724 A1 | 9/2011 | Gaal et al. |
| 2011/0287777 A1* | 11/2011 | Yu .......................... H04L 5/0023 455/452.1 |

(Continued)

FOREIGN PATENT DOCUMENTS

| EP | 2375805 A1 | 10/2011 |
| EP | 2403307 A1 | 1/2012 |
| WO | 2011038243 A2 | 3/2011 |

OTHER PUBLICATIONS

Alcatel-Lucent et al., "Design details for enhanced PDCCH", 3GPP Draft; R1-113322 Design Details for Enhanced PDCCH, 3rd Generation Partnership Project (3GPP), Mobile Competence Centre; 650, Route Des Lucioles; F-06921 Sophia-Antipolis Cedex ; France, vol. RAN WG1, no. Zhuhai; Oct. 10, 2011, Oct. 6, 2011, XP050538589, [retrieved on Oct. 6, 2011].

(Continued)

*Primary Examiner* — Mark Rinehart
*Assistant Examiner* — Kenneth P Hunt
(74) *Attorney, Agent, or Firm* — Seyfarth Shaw LLP

(57) ABSTRACT

A method and apparatus for wireless communication manages virtual cell ID(s) for the common search. A UE determines a first virtual cell ID for a common search space (CSS) enhanced physical downlink control channel (EPDCCH) and determines a second virtual cell ID for a user equipment search space (UESS) EPDCCH. The UE processes EPDCCH based on the determined first and second virtual cell IDs.

22 Claims, 10 Drawing Sheets

(56) References Cited

U.S. PATENT DOCUMENTS

| | | | |
|---|---|---|---|
| 2011/0310817 A1* | 12/2011 | Okubo | H04L 5/0003 370/329 |
| 2012/0140689 A1* | 6/2012 | Pelletier | H04W 76/048 370/311 |
| 2012/0243499 A1* | 9/2012 | Moon | H04L 5/001 370/329 |
| 2012/0263052 A1 | 10/2012 | Dai et al. | |
| 2012/0281566 A1* | 11/2012 | Pelletier | H04W 76/046 370/252 |
| 2012/0281593 A1 | 11/2012 | Stewart et al. | |
| 2012/0282936 A1 | 11/2012 | Gao et al. | |
| 2012/0294694 A1* | 11/2012 | Garot | F27D 1/141 411/427 |
| 2012/0314686 A1 | 12/2012 | Huang | |
| 2013/0010619 A1* | 1/2013 | Fong | H04W 74/002 370/252 |
| 2013/0215835 A1* | 8/2013 | Chen | H04W 72/0406 370/329 |
| 2013/0329657 A1* | 12/2013 | Luo | H04W 72/042 370/329 |
| 2014/0036849 A1* | 2/2014 | Ribeiro | H04W 72/042 370/329 |
| 2014/0086188 A1* | 3/2014 | Hoymann | H04L 5/0053 370/329 |
| 2014/0133427 A1* | 5/2014 | Kim | H04L 5/0053 370/329 |
| 2014/0233663 A1* | 8/2014 | Kang | H04L 5/0037 375/260 |

OTHER PUBLICATIONS

International Search Report and Written Opinion—PCT/US2013/029979—ISA/EPO—Jun. 18, 2013.

* cited by examiner

COMMON SEARCH SPACE FOR EPDCCH IN LTE

CROSS-REFERENCE TO RELATED APPLICATION

This application claims the benefit under 35 U.S.C. §119(e) to U. S. Provisional Patent Application No. 61/615,803 entitled "ON COMMON SEARCH SPACE FOR EPDCCH IN LTE," filed on Mar. 26, 2012, the disclosure of which is expressly incorporated by reference herein in its entirety.

BACKGROUND

1. Field

Aspects of the present disclosure relate generally to wireless communication systems, and more particularly to a common search space for a control channel, such as an enhanced physical downlink control channel (EPDCCH).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect, a method of wireless communication is disclosed. The method includes determining a first virtual cell ID for a common search space (CSS) enhanced physical downlink control channel (EPDCCH) and determining a second virtual cell ID for a user equipment search space (UESS) EPDCCH. The EPDCCH is processed based on the determined first and second virtual cell IDs.

Another aspect discloses wireless communication having a memory and at least one processor coupled to the memory. The processor(s) is configured to determine a first virtual cell ID for a common search space (CSS) enhanced physical downlink control channel (EPDCCH) and determining a second virtual cell ID for a user equipment search space (UESS) EPDCCH. The processor(s) is also configured to process the EPDCCH based on the determined first and second virtual cell IDs.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of determining a first virtual cell ID for a common search space (CSS) enhanced physical downlink control channel (EPDCCH) and determining a second virtual cell ID for a user equipment search space (UESS) EPDCCH. The program code also causes the processor(s) to process the EPDCCH based on the determined first and second virtual cell IDs.

Another aspect discloses an apparatus including means for determining a first virtual cell ID for a common search space (CSS) enhanced physical downlink control channel (EPDCCH) and determining a second virtual cell ID for a user equipment search space (UESS) EPDCCH. The EPDCCH is processed based on the determined first and second virtual cell IDs.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
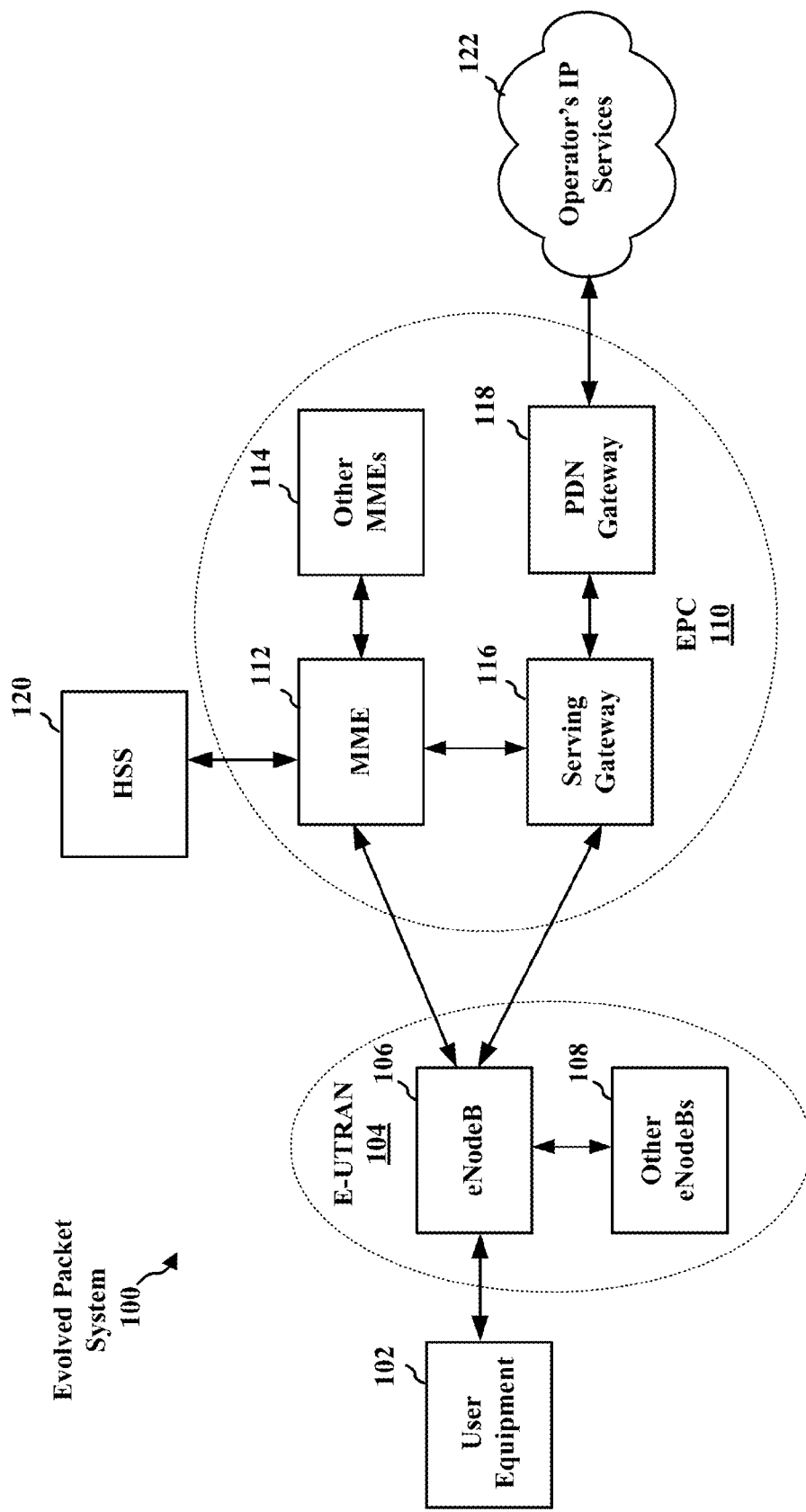
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
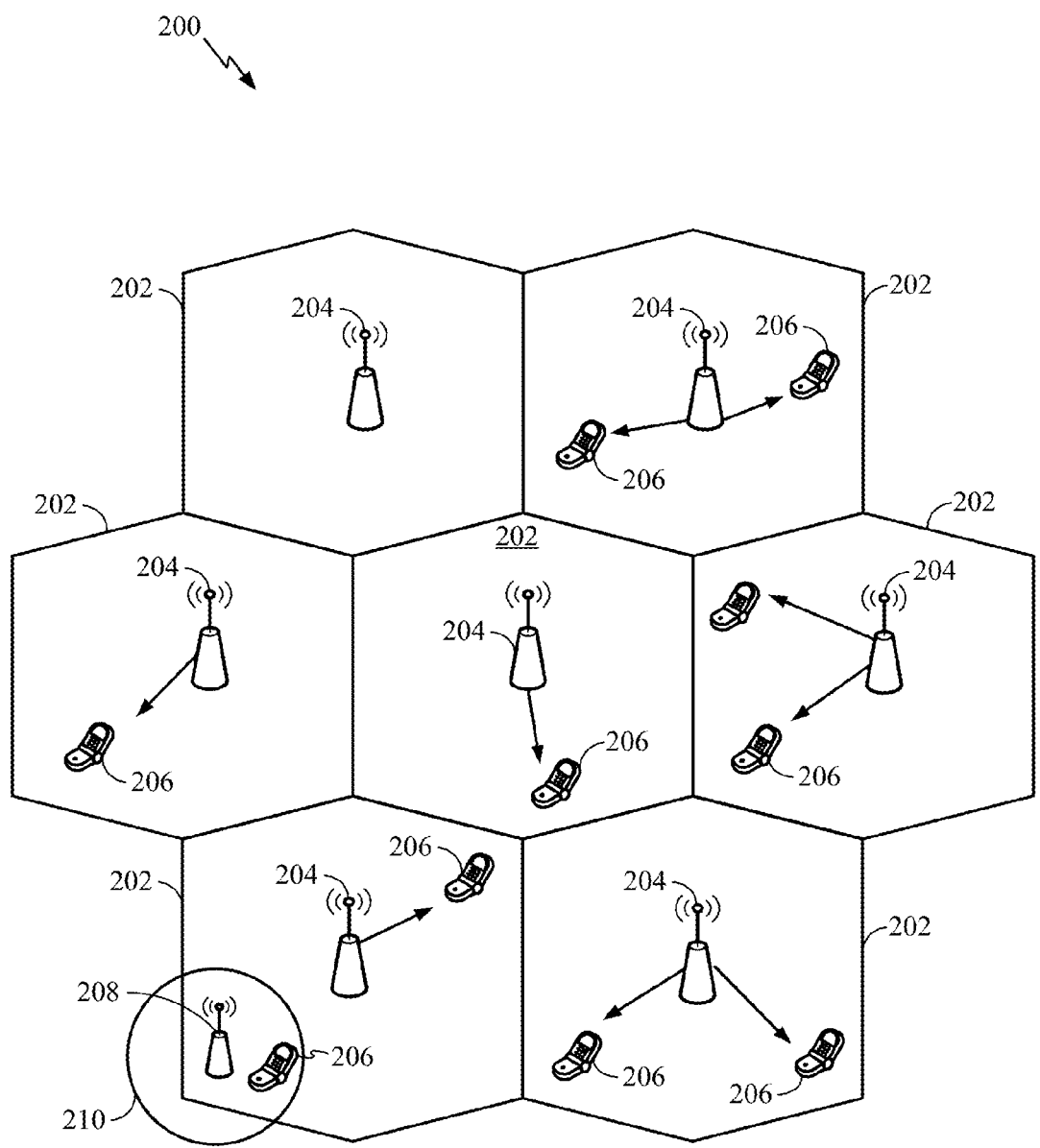
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
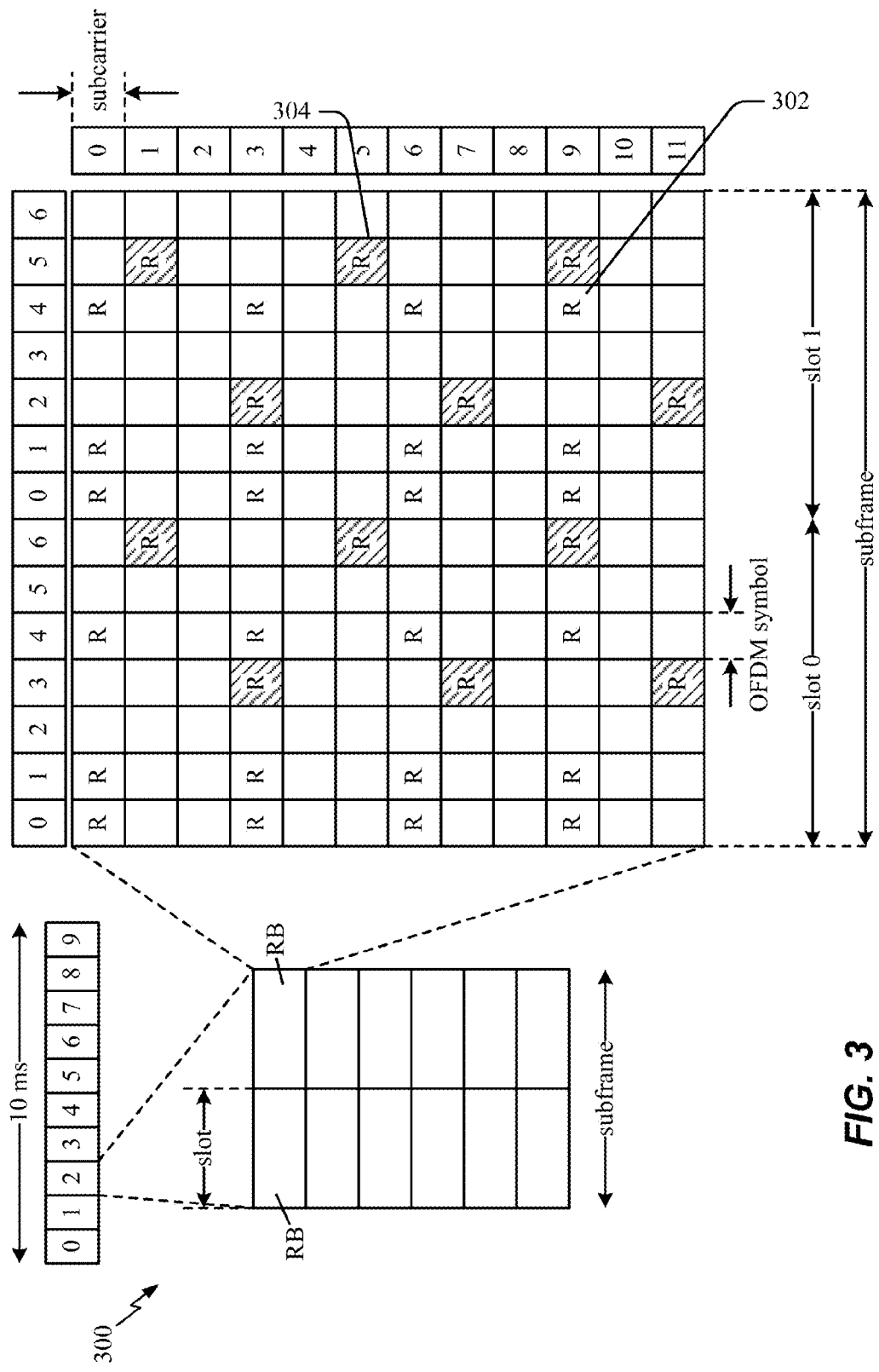
FIG. 3 is a diagram illustrating an example of a downlink frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
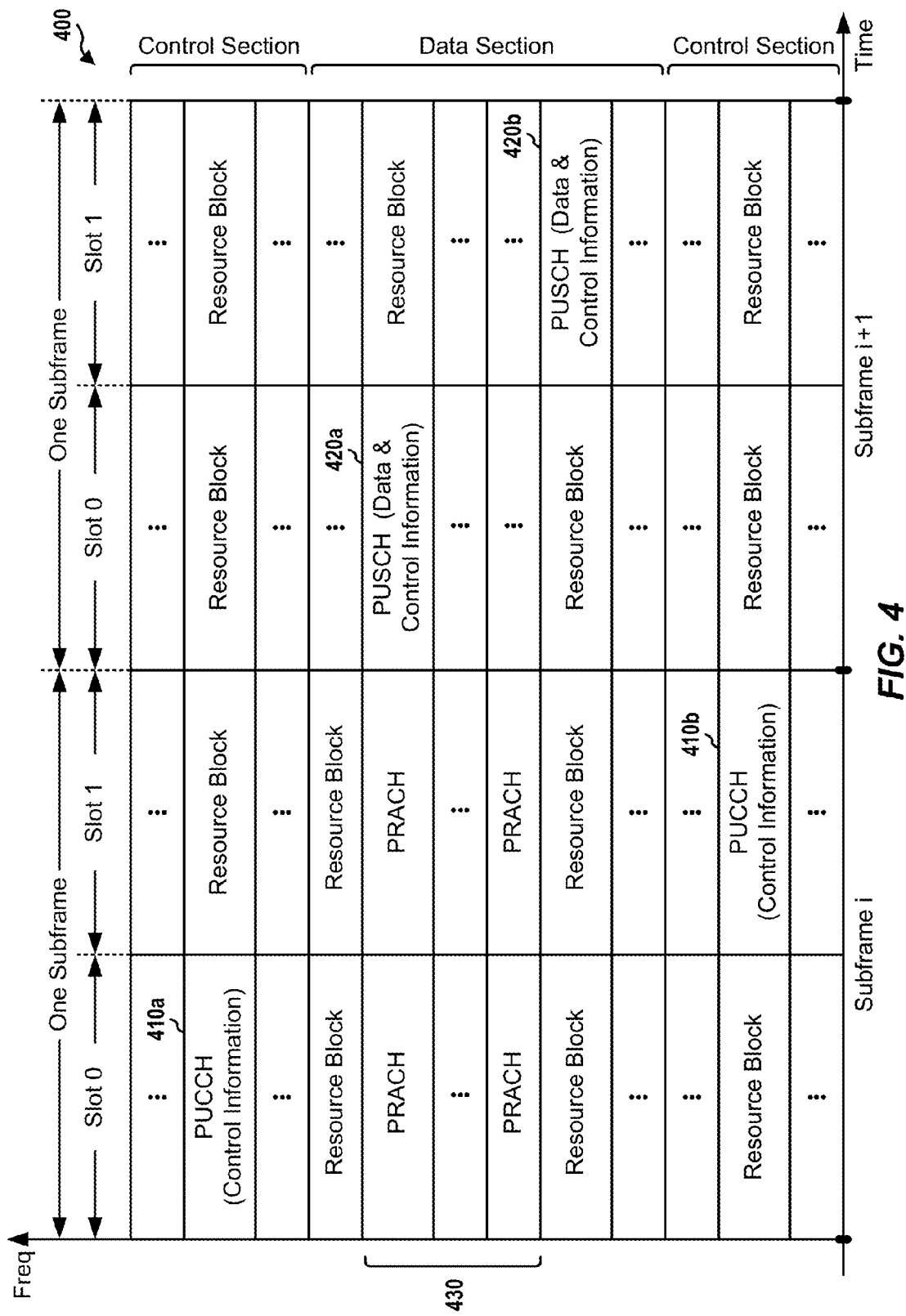
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. A uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
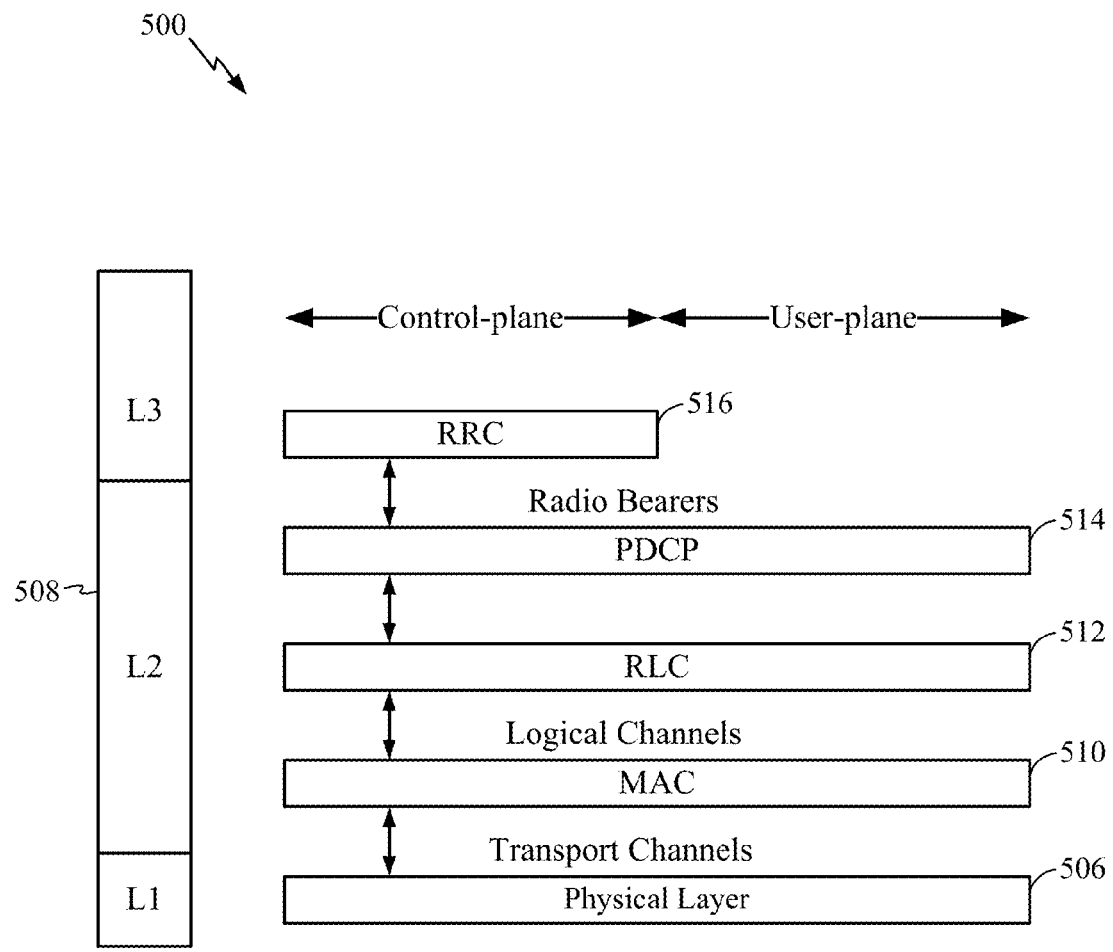
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
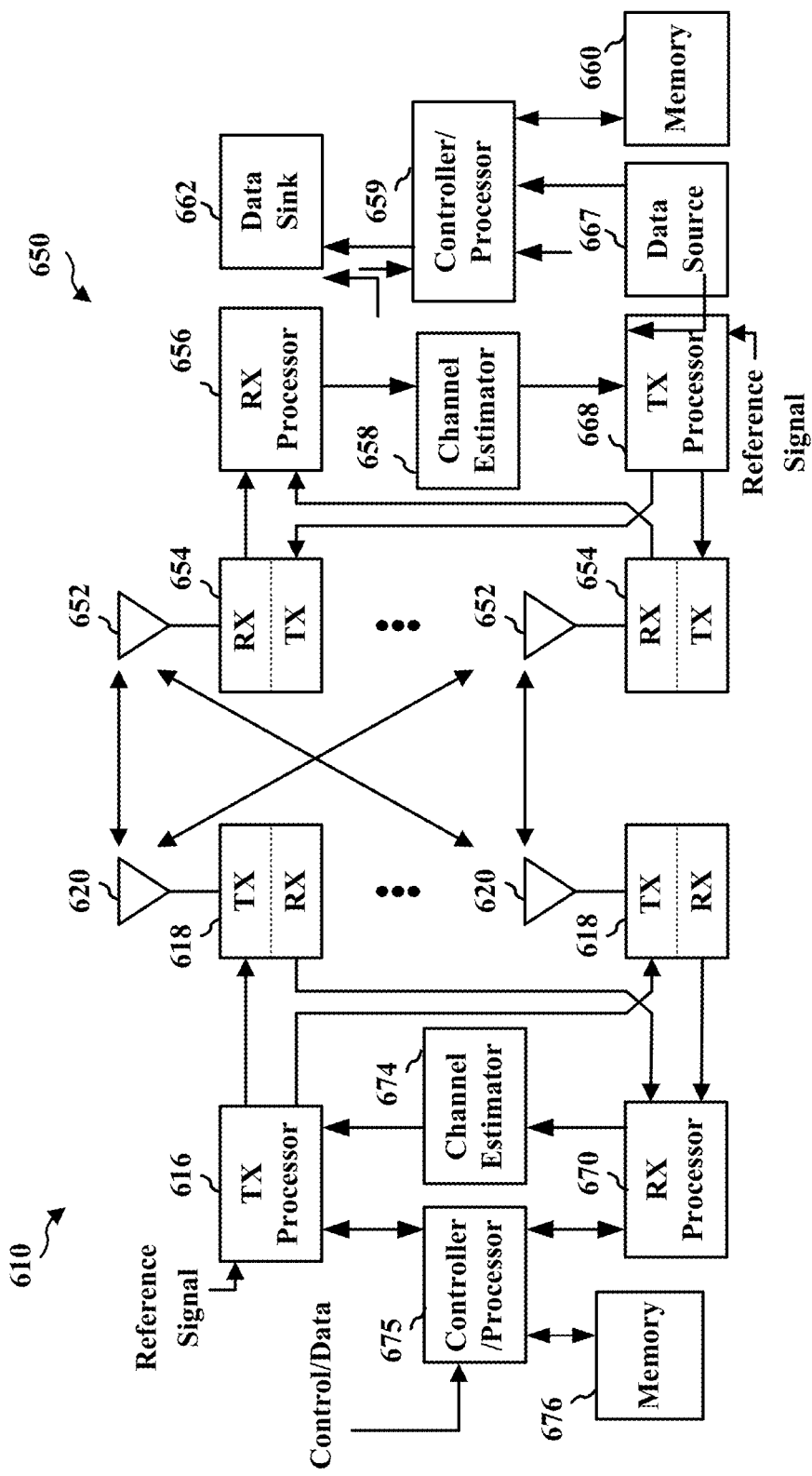
FIG. 6 is a diagram illustrating an example of an evolved Node B and user equipment in an access network.

FIG. 6 is a block diagram of an eNodeB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the DL transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
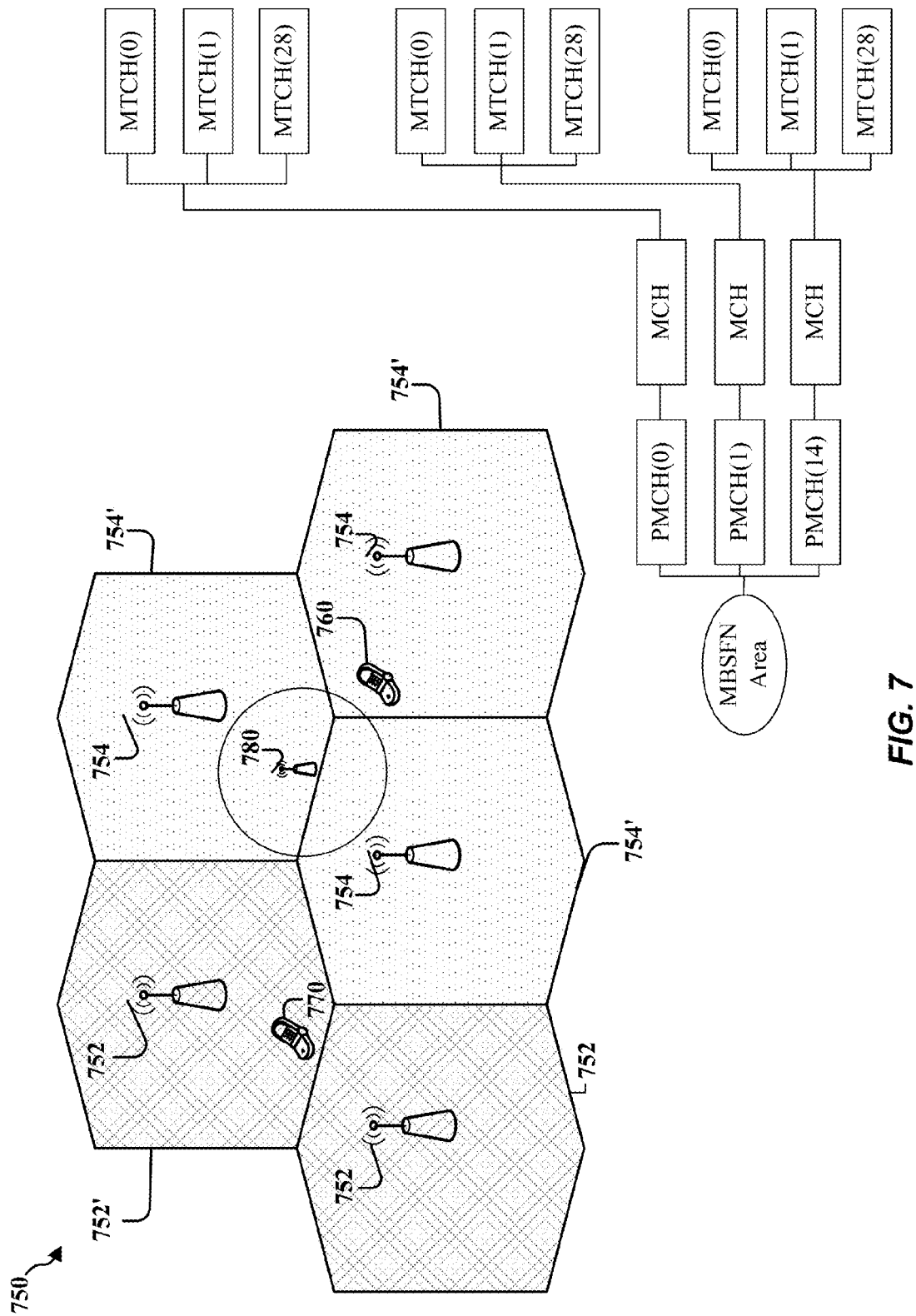
FIG. 7 is a diagram illustrating evolved Multicast Broadcast Multimedia Service in a Multi-Media Broadcast over a Single Frequency Network.

FIG. 7 is a diagram 750 illustrating evolved Multimedia Broadcast Multicast Service (MBMS) in a Multi-Media Broadcast over a Single Frequency Network (MBSFN). The eNodeBs 752 in cells 752' may form a first MBSFN area and the eNodeBs 754 in cells 754' may form a second MBSFN area. Each MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. The first MBSFN area may support a first eMBMS broadcast service, such as by providing a particular news broadcast to the UE 770. The second MBSFN area may support a second eMBMS broadcast service, such as by providing a different news broadcast to the UE 760. Each MBSFN area supports a group of physical multicast channels (PMCH) (e.g., 15 PMCHs). Each PMCH corresponds to a multicast channel (MCH). Each MCH can multiplex a group (e.g., 29) of multicast logical channels. Each MBSFN area may have one multicast control channel (MCCH). As such, one MCH may multiplex one MCCH and a group of multicast traffic channels (MTCHs) and the remaining MCHs may multiplex a group of MTCHs.

As shown in FIG. 7, a reserved cell 780 is within the second MBSFN area formed by the cells 754'. The reserved cell 780 does not provide multicast/broadcast content, but is time-synchronized to the cells 754' and has restricted power on MBSFN resources in order to limit interference to the UEs within the second MBSFN area.

In LTE Releases 8/9/10, the physical downlink control channel (PDCCH) is located within the first several symbols (e.g., one, two, three or four) in a subframe and is fully distributed across the entire system bandwidth. Additionally, the PDCCH is time domain multiplexed (TDM'ed) with the physical downlink shared channel PDSCH, which effectively divides a subframe into a control region and a data region.

In LTE Release 11, an enhanced control channel, such as the enhanced PDCCH (EPDCCH), is introduced. In contrast to a conventional control channel that occupies the first several control symbols in a subframe, the enhanced control channel may occupy the data region, similar to the shared channel (PDSCH). The enhanced control channel may increase control channel capacity, support frequency-domain inter-cell interference coordination (ICIC), improve spatial reuse of control channel resources, support beamforming and/or diversity, operate on the new carrier type and in multimedia broadcast over single frequency network (MBSFN) subframes, and coexist on the same carrier as conventional user equipments (UEs).

In LTE Release-8/9/10, each UE monitors a set of PDCCH decoding candidates. Generally, there are two sets: common (search space) and UE-specific (search space). The common search space (CSS) includes up to six (6) decoding candidates, such as 4 candidates for aggregation level 4 and 2 candidates for aggregation level 8. An aggregation level N is defined as N control channel elements (CCE). Each CCE has 36 resource elements (REs). The common search spaces are common to all UEs and are primarily used for broadcast (e.g., system, paging, random access channel (RACH) response, etc.). The common search space may also be used for unicast scheduling. For each decoding candidate, there are up to 2 distinct downlink control information (DCI) format sizes. Thus, there are up to 6×2=12 blind decodes.

The UE-specific search space (UESS) includes decoding candidates that are a function of the UE ID (and other parameters, e.g., subframe index). The UESS includes up to 16 decoding candidates, {6, 6, 2, 2} for aggregation level {1, 2, 4, 8}, respectively. The downlink assignment and uplink grant share the same set of decoding candidates. For each decoding candidate, there may be up to 2 (Rel-8/9) or 3 (Rel-10) distinct DCI format sizes. In particular, one format size for downlink and uplink compact DCI formats, one format size for downlink mode dependent format (e.g., MIMO), and one format size for uplink MIMO operation (only in Rel-10). For the UESS there are up to 16×2=32 (Rel-8/9) or 16×3=48 (Rel-10) blind decodes. The maximum number of blind decodes is: 12+32=44 (Rel-8/9) or 12+48=60 (Rel-10) per UE per carrier.

Figure 8:
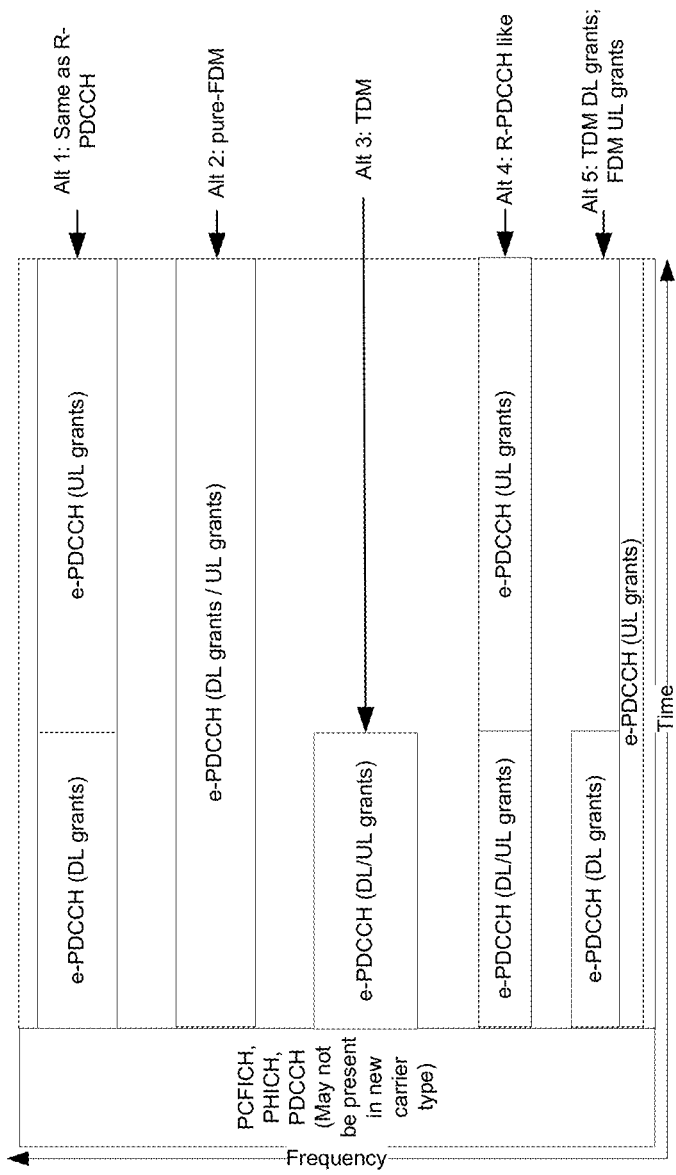
FIG. 8 is a diagram illustrating various EPDCCH structures.

FIG. 8 illustrates an example of various EPDCCH structures. For example, in one aspect, the EPDCCH structure may be the same as the R-PDCCH structure. Alternately, in another aspect, the EPDCCH may be pure-FDM (frequency division multiplexing). Optionally, in an alternate structure, the EPDCCH structure is all TDM. Alternately, the EPDCCH is similar, but not the same as R-PDCCH. In still another alternate structure, the EPDCCH may combine TDM and FDM.

In some configurations, both localized and distributed transmission are supported for EPDCCH. For localized transmission, and for distributed transmission where the common reference signal (CRS) is not used for demodulation of the enhanced control channel, the demodulation of the enhanced control channel is based on the demodulation reference signal (DMRS). The DMRS is transmitted in the physical resource blocks (PRBs) used for the transmission of the enhanced control channel.

When the enhanced control channel is based on frequency division multiplexing (FDM), the enhanced control channel spans both the first and second slots. In some cases, there may be a restriction on the maximum number of transport channel (TrCH) bits receivable in a transmission time interval (TTI). A shared channel and an enhanced control channel may not be multiplexed within a physical resource block (PRB) pair.

LTE Release 11 supports coordinated multipoint transmission (CoMP) schemes. CoMP schemes refer to coordinated transmissions from multiple eNodeBs (downlink CoMP) or receptions from one or more UEs (uplink CoMP). Downlink CoMP and uplink CoMP may be separately or jointed enabled for a UE. Some examples of CoMP schemes are joint transmission (JT) (downlink CoMP) where multiple eNodeBs transmit the same data meant for a UE, and joint reception (uplink CoMP) where multiple eNodeBs receive the same data from a UE. CoMP schemes may also support coordinated beamforming (CBF) where an eNodeB transmits to the served UEs using beams that are chosen to reduce interference to UEs in neighboring cells. Additionally, CoMP schemes may also support dynamic point(s) selection (DPS) where the cell(s) involved in data transmissions change from subframe to subframe.

CoMP may exist in homogeneous networks and/or heterogeneous networks (HetNet). The connection between the nodes involved in CoMP can be X2 or fiber. In some cases, one or more virtual cell IDs may be configured for a UE on a shared channel for improved CoMP operation. In HetNet CoMP, low power nodes may be referred to as remote radio heads (RRH). Furthermore, the virtual cell ID to be used for a shared channel in a subframe may be dynamically indicated to the UE.

Traditionally, the PDSCH transmitted from a cell is associated with the physical cell ID (PCI) of the cell. For example, the scrambling sequence for the PDSCH is initialized with a seed based on the PCI of the cell. For various CoMP scenarios, the PDSCH is disassociated with a particular cell ID. For example, the scrambling sequence for the PDSCH in a cell may be initialized with a seed based on a virtual cell ID (which may or may not be the same as the cell ID). This facilitates CoMP and MIMO operation (such as dynamic point(s) switch, decoupled control and data, multi-user multiple input multiple output (MU-MIMO) in a cell, etc.) The virtual cell ID may also apply to EPDCCH.

One aspect of the present disclosure is directed to managing virtual cell ID(s) for the common search space (CSS) EPDCCH and for the UE specific search space (UESS) EPDCCH when the CSS is supported for EPDCCH. Other aspects are directed to supporting multicast radio network temporary identifiers (M-RNTIs) for MBMS service, supporting CRS based on the CSS EPDCCH, overlapping search spaces and rate matching for the CSS.

One aspect is directed to virtual cell IDs for the CSS. The CSS and UESS EPDCCH have different specifications in terms of performance, scheduling, payload sizes, modulation coding schemes (MCS), etc. Different cells or different sets of cells may be involved in transmitting the CSS EPDCCH and the UESS EPDCCH, respectively. For example, a first cell (i.e., cell 1) and a second cell (i.e., cell 2) may both transmit the CSS EPDCCH for a UE, while only cell 1 transmits the UESS EPDCCH for the UE.

One aspect of the virtual cell ID management is directed to defining the CSS and UESS EPDCCH separately. In one example, a virtual cell ID 1 is defined for the CSS EPDCCH, and virtual cell ID 2 and virtual cell ID 3 are defined for the UESS EPDCCH. Some virtual cell IDs may be the same as the physical cell ID. For example, the CSS EPDCCH may use the actual physical cell ID. Additionally, one of the cell IDs 2 and 3 may be the same as cell ID 1. Further, the virtual IDs for the CSS and UESS EPDCCH may be updated differently. For example, the virtual cell IDs for the UESS may be updated dynamically while the virtual cell ID for the CSS EPDCCH may be updated on a semi-static or static basis.

The CSS for the EPDCCH may be transmitted from a subset of cells involved in a CoMP communication of the same physical cell ID (e.g., scenario 4). For example, DCI format 3 and/or 3A (group power control) can be individually transmitted from a cell or a subset of cells in the set of cells of the physical cell ID. Similarly, a random access response grant can be transmitted from a subset of cells of the set of cells having the same physical cell ID.

In another aspect, different virtual cell IDs are defined for different radio network temporary identifiers (RNTIs) in the CSS for EPDCCH. For example, the paging radio network temporary identifier (P-RNTI), system information radio network temporary identifier (SI-RNTI) and random access radio network temporary identifier (RA-RNTI) have a first virtual (or physical) cell ID (or a first set of virtual cell IDs), while the transmit power control (TPC) PUCCH RNTI/TPC PUSCH RNTI may have a different virtual cell ID (or a second set of virtual cell IDs). This is because some information scheduled via the CSS EPDCCH may have different coverage areas and/or target groups of UEs compared with other information. Additionally, the virtual cell ID(s) for the CSS can be broadcast or UE-specifically configured.

Another aspect of the disclosure is directed to supporting multicast radio network temporary identifiers (M-RNTI) for MBMS based on the carrier type. For example, when the carrier(s) is a legacy carrier (backward compatible), there is no support of M-RNTI in the CSS EPDCCH. When the carrier(s) is a new carrier type, especially when there is no legacy control region, there may be support of M-RNTI in the CSS EPDCCH.

Another aspect is directed to the reference signals in the search space and whether they are based on the demodulation reference signal (DMRS) or the common reference signal (CRS). In one example configuration, DMRS is used for both the CSS and UESS EPDCCH. A search space dependent reference signal (RS) type EPDCCH may also be considered. For example, in one configuration DMRS is used for the UESS EPDCCH and the common reference signal (CRS) for the CSS EPDCCH. If it is a CRS based CSS EPDCCH, then DMRS resource elements (REs) may be discounted for the CSS EPDCCH. In one aspect, DMRS resource elements are discounted and can be defined as always discounting the 24 DMRS REs per physical resource block (PRB) pair. In an alternate aspect, DMRS resource elements are not discounted.

Still another aspect of the present disclosure is directed to handling overlapped search spaces. In particular, the UESS and CSS EPDCCH for a UE may overlap. In one configuration, the UE handles the overlapped search spaces by assigning the CSS a higher priority. Alternately, the UE may handle the overlapped search spaces by assigning higher priority to the UESS. Optionally, the priority of the CSS vs. the UESS may depend on a configuration or parameter. For example, layer 3 may be configured as a priority between the CSS and UESS. In another example, the priority assignment is subframe dependent, decoding candidate dependent, etc. For example, in some subframes, the CSS has higher priority. In other subframes, the CSS has low priority.

In an alternate methodology, different physical layer constructions are utilized to reduce ambiguity at the UE side about whether an EPDCCH is from the CSS or UESS in the overlapped region. For example, the number of resource elements used by the CSS EPDCCH may be different from the number used for the UESS EPDCCH. Additionally, the way the modulation symbols mapped to resources may be different (e.g., in different orders) between the CSS EPDCCH and the UESS EPDCCH. Further, the scrambling/randomization may be done differently (e.g., different order, different cell ID) by the CSS EPDCCH and the UESS EPDCCH. Additionally, rate matching may be performed differently by the CSS EPDCCH as compared to UESS EPDCCH.

Another aspect is directed to handling rate matching. The CSS EPDCCH may use more protection than the UESS EPDCCH. As a result, the CSS EPDCCH and UESS EPDCCH may have different rate matching. For example, in one configuration the UESS EPDCCH rate matches around the serving cell CRS, while the CSS EPDCCH rate matches around the CRS of the serving CRS and neighboring cell's CRS. In an extreme case, the entire symbol(s) containing CRS can be excluded from the usage for the CSS EPDCCH.

Figure 9:
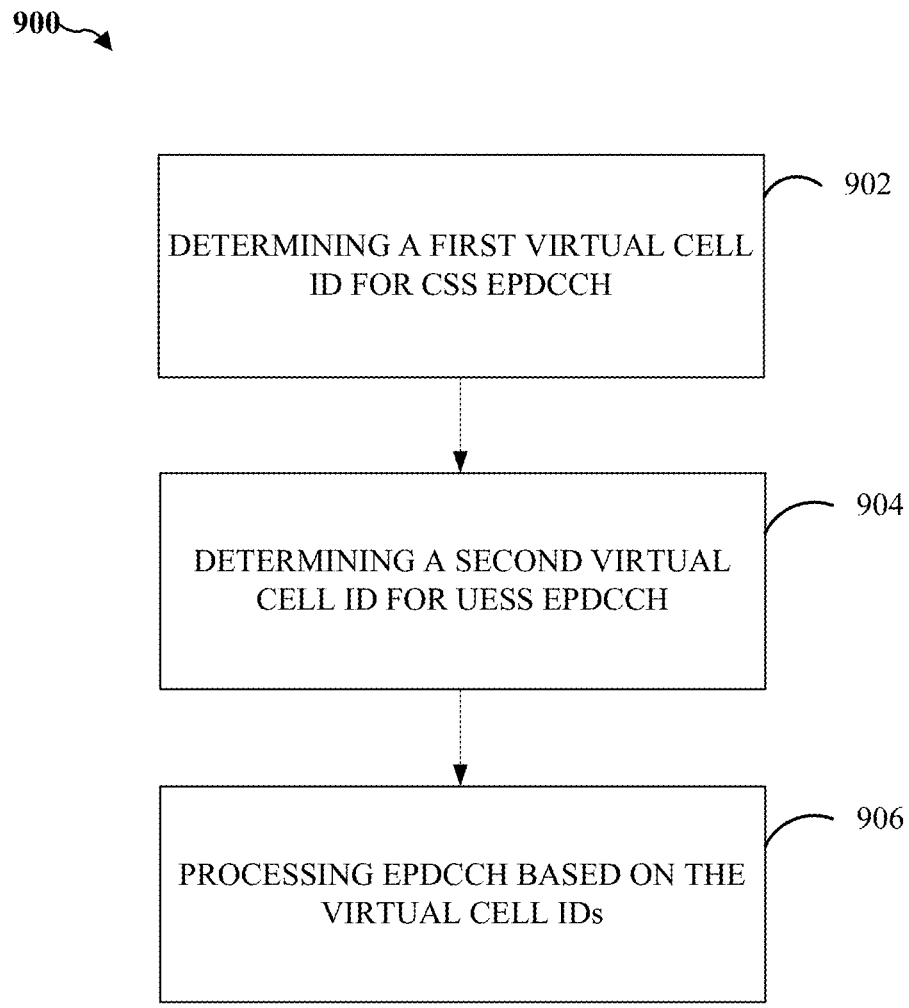
FIG. 9 is a block diagram illustrating a method for managing common search space for EPDCCH.

FIG. 9 illustrates a method 900 for managing the common search space for EPDCCH. In block 902, a first virtual cell ID is determined for a CSS EPDCCH. In block 904, a second virtual cell ID is determined for a UESS EPDCCH. The EPDCCH is processed in block 906 based on the virtual cell IDs.

In one configuration, the UE 650 is configured for wireless communication including means for determining a first virtual cell ID and means for determining a second virtual cell ID. In one aspect, the determining means may be the controller/processor 659 and memory 660 configured to perform the functions recited by the determining means. The UE 650 is also configured to include a means for processing the EPDCCH. In one aspect, the processing means may be the memory 660, and/or the controller/processor 659 configured to perform the functions recited by the processing means. In another aspect, the aforementioned means may be any module or any apparatus configured to perform the functions recited by the aforementioned means.

Figure 10:
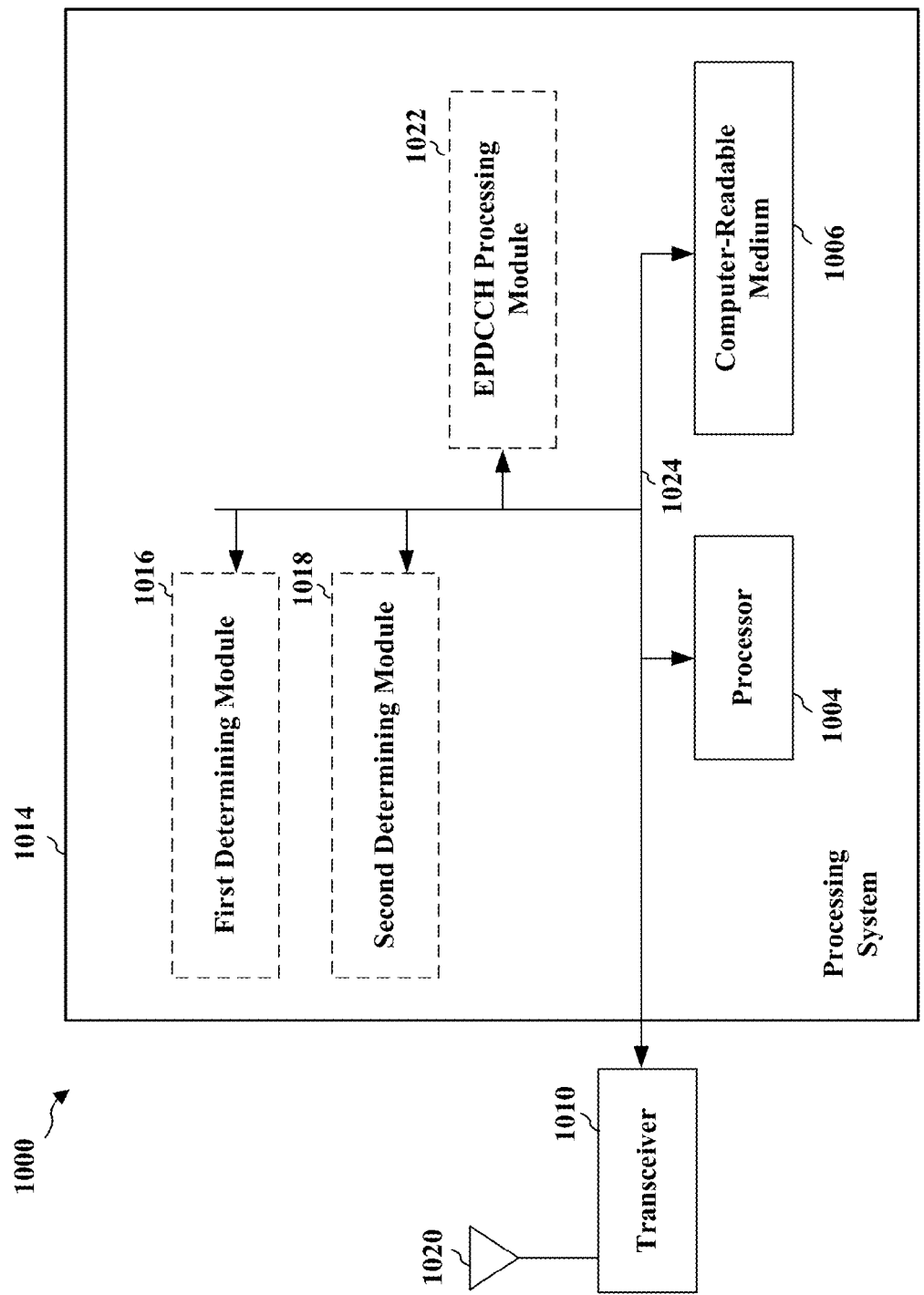
FIG. 10 is a conceptual data flow diagram illustrating the data flow between different modules/means/components in an exemplary apparatus.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004 the modules 1022, 1018, 1016, and the computer-readable medium 1006. The bus 1024 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1020. The transceiver 1010 enables communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described for any particular apparatus. The computer-readable medium 1006 may also be used for storing data that is manipulated by the processor 1004 when executing software.

The processing system includes a first determining module 1016 and a second determining module 1018. The first determining module can determine a first virtual cell ID for a CSS EPDCCH. The second determining module can determine a second virtual cell ID for a UESS EPDCCH. The processing system also includes an EPDCCH processing module 1022 for processing EPDCCH based on the virtual cell IDs. The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or the controller/processor 659.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   determining, at a user equipment (UE), a first virtual cell ID for a common search space (CSS) enhanced physical downlink control channel (EPDCCH);
   determining, at the UE, a second virtual cell ID for a user equipment search space (UESS) EPDCCH;
   statically updating the first virtual cell ID based on a virtual cell ID statically configured for the UE and dynamically updating the second virtual cell ID based on a virtual cell ID dynamically indicated to the UE; and
   processing an EPDCCH based on the determined first and second virtual cell IDs.

2. The method of claim 1, in which the first virtual cell ID is the same as a physical cell ID (PCI).

3. The method of claim 1, further comprising determining a plurality of different virtual cell IDs for the CSS EPDCCH, a first of the plurality corresponding to a first type of radio network temporary identifier (RNTI) and a second of the plurality corresponding to a second type of RNTI different from the first type.

4. The method of claim 3, in which the first type of RNTI comprises at least one of a system information (SI)-RNTI, a paging RNTI, or a random access RNTI; and
   in which the second type of RNTI comprises at least one of a transmit power control (TPC) physical uplink shared data channel (PUSCH) RNTI or a TPC physical uplink control channel (PUCCH) RNTI.

5. The method of claim 1, further comprising broadcasting the determined first virtual cell ID.

6. The method of claim 1, further comprising supporting a multimedia broadcast multicast service (MBMS) radio network temporary identifier (RNTI) in at least one of the CSS EPDCCH or UESS EPDCCH.

7. The method of claim 1, further comprising assigning a higher priority to the CSS EPDCCH.

8. The method of claim 1, further comprising assigning a higher priority to the UESS EPDCCH.

9. The method of claim 1, further comprising prioritizing the CSS EPDCCH and UESS EPDCCH based on a predetermined parameter.

10. The method of claim 1, further comprising:
    determining at least one resource element (RE) assigned to a common reference signal (CRS) of a serving cell;
    mapping the CSS EPDCCH to at least one other resource element; and
    rate matching the UESS EPDCCH around the at least one RE assigned to the CRS, in which the CSS EPDCCH has a rate matching that is different from a rate matching of the UESS EPDCCH.

11. A user equipment (UE) for wireless communication, comprising:
    a memory; and
    at least one processor coupled to the memory, the at least one processor being configured:
       to determine a first virtual cell ID for a common search space (CSS) enhanced physical downlink control channel (EPDCCH);
       to determine a second virtual cell ID for a user equipment search space (UESS) EPDCCH;
       to statically update the first virtual cell ID based on a virtual cell ID statically configured for the UE and to dynamically update the second virtual cell ID based on a virtual cell ID dynamically indicated to the UE; and
       to process an EPDCCH based on the determined first and second virtual cell IDs.

12. The UE of claim 11, in which the first virtual cell ID is the same as a physical cell ID (PCI).

13. The UE of claim 11, in which the at least one processor is further configured to determine a plurality of different virtual cell IDs for the CSS EPDCCH, a first of the plurality corresponding to a first type of radio network temporary identifier (RNTI) and a second of the plurality corresponding to a second type of RNTI different from the first type.

14. The UE of claim 13, in which the first type of RNTI comprises at least one of a system information (SI)-RNTI, a paging RNTI, or a random access RNTI; and in which the second type of RNTI comprises at least one of a transmit power control (TPC) physical uplink shared data channel (PUSCH) RNTI or a TPC physical uplink control channel (PUCCH) RNTI.

15. The UE of claim 11, in which the at least one processor is further configured to broadcast the determined first virtual cell ID.

16. The UE of claim 11, in which the at least one processor is further configured to support multimedia broadcast and a multicast service (MBMS) radio network temporary identifier (RNTI) in at least one of the CSS EPDCCH or DESS EPDCCH.

17. The UE of claim 11, in which the at least one processor is further configured to assign a higher priority to the CSS EPDCCH.

18. The UE of claim 11, in which the at least one processor is further configured to assign a higher priority to the UESS EPDCCH.

19. The UE of claim 11, in which the at least one processor is further configured to prioritize the CSS EPDCCH and UESS EPDCCH based on a predetermined parameter.

20. The UE of claim 11, in which the at least one processor is further configured:
    to determine at least one resource element (RE) assigned to a common reference signal (CRS) of a serving cell;
    to map the CSS EPDCCH to at least one other resource element; and
    to rate match the UESS EPDCCH around the at least one RE assigned to the CRS, in which the CSS EPDCCH has a rate matching that is different from a rate matching of the UESS EPDCCH.

21. A non-transitory computer-readable medium having non-transitory program code recorded thereon, the program code comprising:

program code to determine, at a user equipment (UE), a first virtual cell ID for a common search space (CSS) enhanced physical downlink control channel (EPDCCH);

program code to determine, at the UE, a second virtual cell ID for a user equipment search space (UESS) EPDCCH;

program code to statically update the first virtual cell ID based on a virtual cell ID statically configured for the UE and dynamically update the second virtual cell ID based on a virtual cell ID dynamically indicated to the UE; and program code to process an EPDCCH based on the determined first and second virtual cell IDs.

22. An apparatus for wireless communication, comprising:

means for determining, at a user equipment (UE), a first virtual cell ID for a common search space (CSS) enhanced physical downlink control channel (EPDCCH);

means for determining, at the UE, a second virtual cell ID for a user equipment search space (DESS) EPDCCH;

means for statically updating the first virtual cell ID based on a virtual cell ID statically configured for the UE and dynamically updating the second virtual cell ID based on a virtual cell ID dynamically indicated to the UE; and means for processing an EPDCCH based on the determined first and second virtual cell IDs.

* * * * *